UNITED STATES PATENT OFFICE 2,000,122

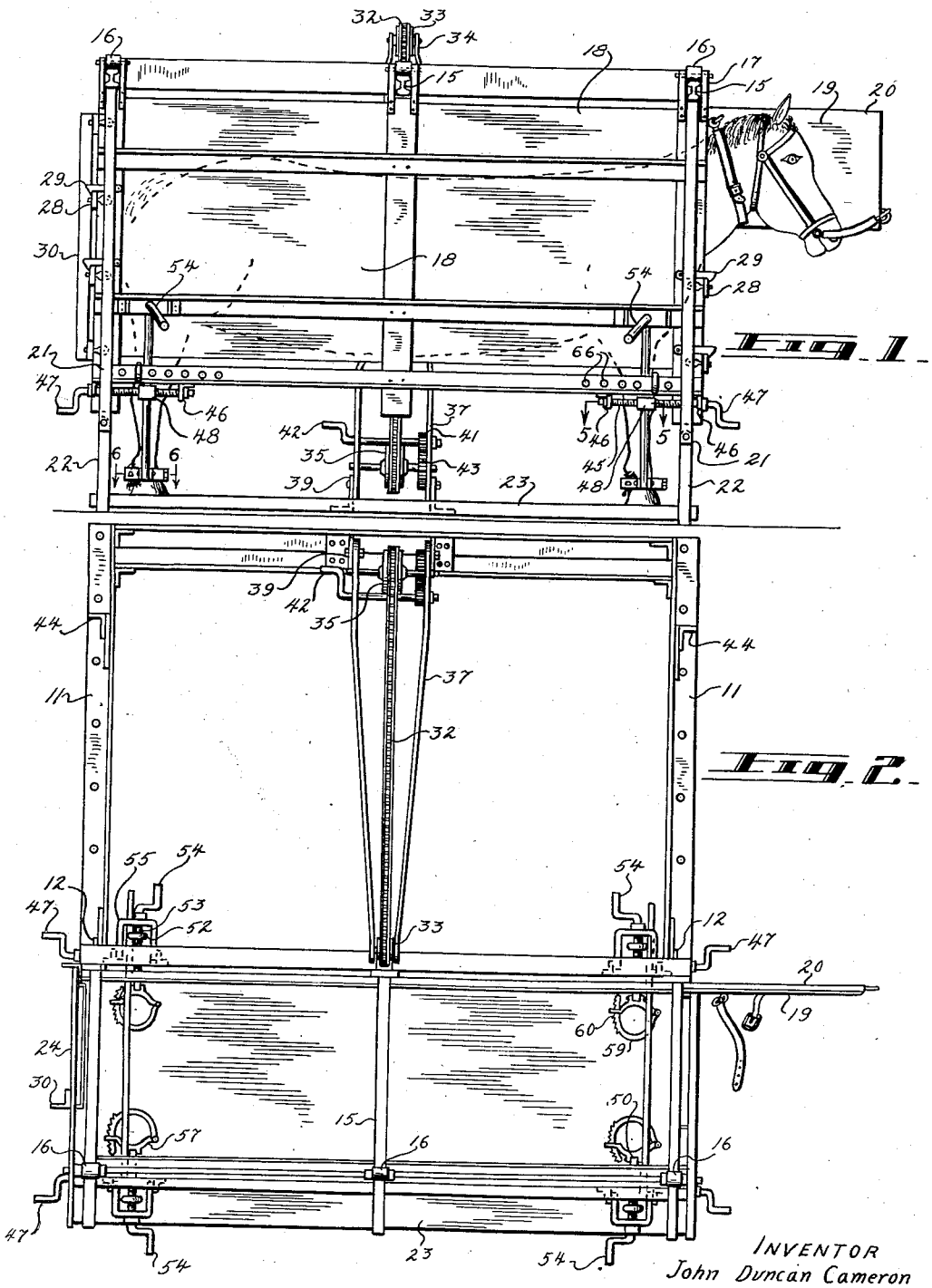

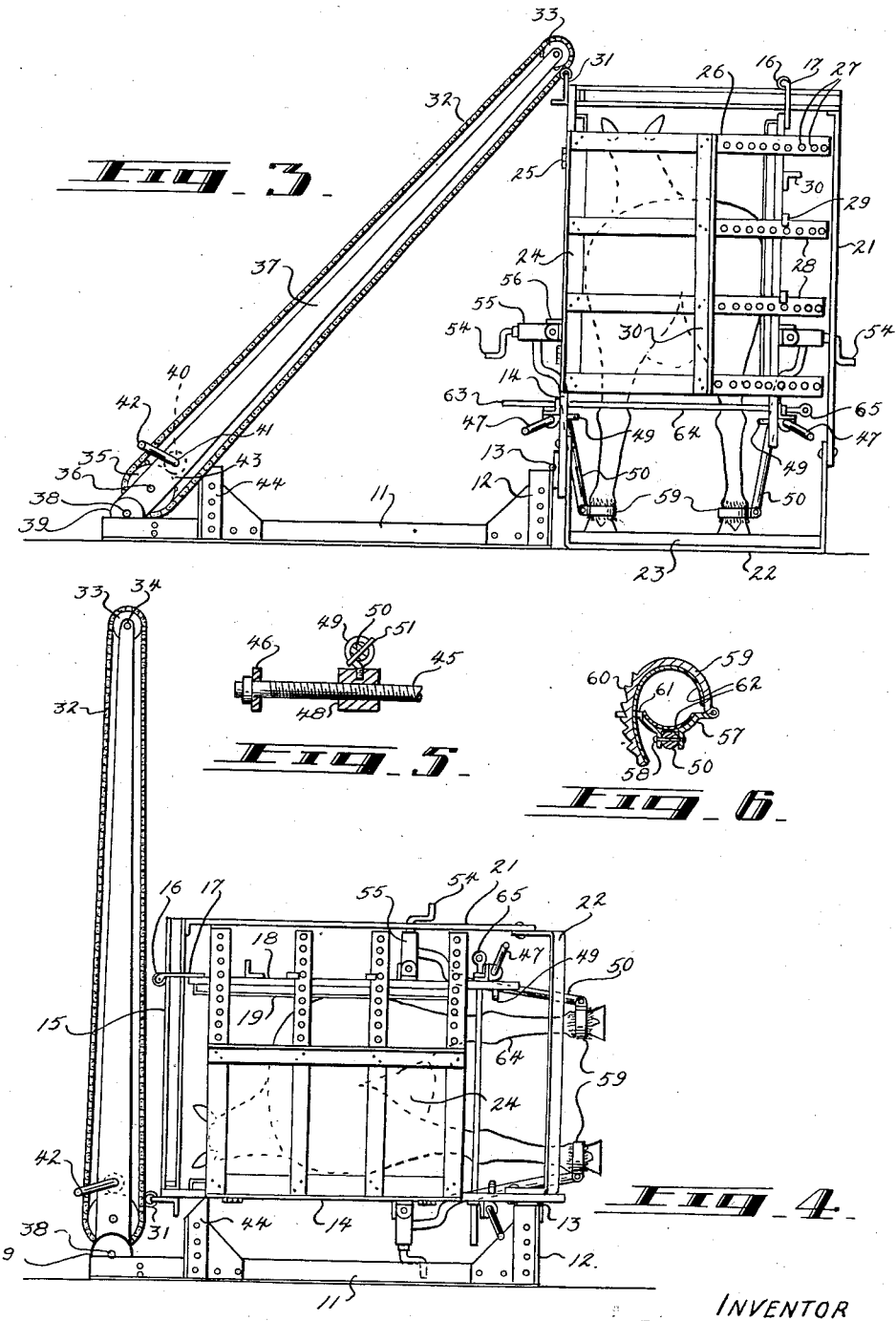

HORSE SHOEING AND VETERINARY RACK

John Duncan Cameron, Dresden, Ontario, Canada

Application February 19, 1931, Serial No. 517,035. Renewed September 1, 1934. In Canada February 19, 1930

6 Claims. (Cl. 119—103)

This present invention relates to certain new and useful improvements in a horse shoeing and veterinary rack.

The primary object of the invention resides in the provision of a horse shoeing and veterinary rack which will effectively hold the animal while operating thereon.

The invention has for another object the provision of a horse shoeing and veterinary rack of the character stated which is of extremely simple and inexpensive construction as well as highly efficient in use and which may be readily manipulated by a single operator.

The invention has for a further object the provision of a horse shoeing and veterinary rack of the character stated which may be readily adjusted to horses, cattle and various animals of different sizes to firmly hold the same as in upright position or on one side while operating on the animal.

The invention has for a still further object the provision of a horse shoeing and veterinary rack of the character stated in which the animal may be readily placed and secured without frightening the animal and without the necessity of first strapping the animal or throwing the same off of its feet.

The invention has for a still further object the provision of a horse shoeing and veterinary rack of the character stated which is constructed so that each leg of the animal may be firmly held as well as the neck while the body of the animal is held firmly in the body of the rack.

The invention has for a still further object the provision of a horse shoeing and veterinary rack of the character stated in which the clamping means for the legs of the animal may be readily adjusted thereto after adjustment of the frame or body of the rack according to the size of the animal and the entire body of the rack tilted with the animal firmly held therein and the legs as well as the neck also firmly held against movement.

The invention has for a still further object the provision of a horse shoeing and veterinary rack of the character stated in which the body of the rack is constructed and mounted in such a manner that it may be readily tilted on to one side or returned to upright position with the animal firmly held therein, without the necessity of the operator bearing the weight of the animal or the weight of the rack.

In the drawings:

Figure 1 is a side elevation of the improved horse shoeing and veterinary rack, showing a horse firmly secured therein with each of its legs also clamped to hold them against movement during the operation of shoeing the horse or working on the hoofs thereof;

Figure 2 is a plan view of the rack with the animal omitted;

Figure 3 is a rear elevation of the rack with the animal secured therein and the body or frame of the rack in upright position;

Figure 4 is a view similar to Figure 3, showing the body or frame of the rack tilted on the side and holding therein the animal;

Figure 5 is a slightly enlarged detail section, taken substantially on the plane of line 5—5 of Figure 1, looking in the direction indicated by the arrows; and Figure 6 is a similar view taken substantially on the plane of line 6—6 of Figure 1, looking in the direction indicated by the arrows.

Referring more in detail to the drawings, it is to be noted that the horse shoeing and veterinary rack includes a base 11 of rectangular form and composed of angle irons which may be readily secured to the floor or other stationary support. This base 11 has upstanding portions 12 at one side with hinges 13 mounted thereon which are also secured to one side member 14 of the frame or body of the rack. This side member 14 is of rectangular form and preferably solid with arms 15 extended laterally from its outer side and adjacent the ends thereof to receive rollers 16 operating on the upper face of said arms 15 and carried in the upper ends of bracket members 17 extending upwardly from the opposite rectangular side member 18 of the frame or body of the rack to support said second side 18 and provide for adjustment of the same toward and away from the side 14. The sides 14 and 18 have an appropriate padding 19 on their opposed faces and the side 14 also has a padded narrow end extension 20 against which the neck and head of the horse or other animal may be strapped when the animal is placed in the rack. Rigid outer corner members 21 depend from the outer ends of the arms 15 to provide for suspension of a pair of false bottom supporting members 22 of substantially U-shaped form having the upper ends of their upstanding arms fulcrumed on the lower ends of said depending corner members 21 and opposite depending portions of the side 14 of the frame or body, so that a false bottom 23 for the rack may be readily supported in the members 22 when the device is in normal position. The frame or body of the rack also includes end members 24 hingedly connected with the side 14 by appropriate hinges 25. The end members 24 may also be padded on their inner faces, if desired. The end members 24 include parallel outwardly directed arms 26 extended from the main or solid portion of said end members 24 toward the side 18 and past the ends of the latter, the arms 26 being provided with spaced perforations 27 through which may be engaged rods 28 projecting from the end of the side member 18 when the latter is brought to proper position with respect to the side member 14. Latch members 29 are also carried by the side member 18 for detachable engagement over the edges of the arms 26 to hold the same firmly against the ends of the side member 18. The side members 14 and 18 and the end members 24, the greater portion of which are solid, are reinforced by reinforcing angle irons 30 provided thereon.

A hook 31 is extended upwardly from the centre of the upper edge of the side member 14 of the frame or body and connected with the sprocket chain 32 operating over a small upper sprocket wheel 33 on an upper shaft 34 and a larger sprocket wheel 35 on a lower sprocket shaft 36. These shafts 34 and 36 are carried respectively in the upper and lower ends of a frame 37, the lower extremity of which is fulcrumed on a rod 38 carried in brackets 39 supported in the side of the base 11 the farthest from the side of the face on which the side member 14 of the frame or body is hinged. A driving gear wheel 40 is carried on a shaft 41 also extended transversely through and rotatable in the inclined frame 37 and having a turned or handle forming crank end 42 by means of which the shaft 41 may be readily operated. The gear wheel 40 meshes with a larger gear wheel 43 on the shaft 36 with the large sprocket wheel 35 so that by operation of the crank handle 42 of the shaft 41, the chain 32 may be readily operated in the proper direction around the sprocket wheels 33 and 35 to either tilt the frame or body from its upright position over to a horizontal position above the base 11 or from such horizontal position back to its normal or upright position with the animal firmly held in the frame or body. Appropriate upstanding rests 44 are carried at the ends of the base 11, near the outer corners thereof to receive and serve as rests for the side 14 of the frame or body and thus co-operate with the upstanding portions 12 of the base 11 in firmly supporting the frame or body in horizontal position over the base 11 with the animal firmly held in the frame or body.

Special mechanism is provided for holding each leg of the animal independently and in a natural position. This mechanism includes for each leg a longitudinal threaded shaft 45 rotatable in appropriate brackets 46 depending from the lower edge of one of the frame or body side members 14 and 18. The outer extended end 47 of each threaded shaft 45 is in the form of a crank handle for operating or rotating the threaded shaft 45. Working on each shaft 45 between the suspending brackets 46 therefor is a block 48 which is moved toward one end of the threaded shaft 45, according to the direction of rotation of the latter. A ring or screw eye 49 is carried by the block 48, extending to one side thereof and a rod 50 depends through the ring or the head of the screw eye 49 with a pin 51 extended transversely through the rod 50, above the ring or eye of the screw eye 49 to prevent downward movement of the rod 51 in said ring or screw eye 49. The enlarged upper end 52 of the rod 50 has threaded therethrough a rod 53 having an outer crank end 54. This rod 53 is rotatably mounted in a bracket 55 of substantially U-shaped form and which in turn has its arms fulcrumed in an appropriate pair of brackets 56 supported on the outer face of either of the side member 14 or the side member 18 of the frame or body structure. Thus, the frame 55 has a vertical swinging movement in the bracket 56. The rod 50 has fulcrumed on its lower end a foot clamping member 57 mounted by its central portion on the rod 50 by means of a transverse fulcrum pin 58. This foot clamping member 57 is of substantially arcuate form with its opposite ends turned outwardly in opposite directions and substantially in alignment. Hinged to one of said ends of the clamping member 57 is one end of a complementary clamping member 59 which is of arcuate form and has an extended toothed end 60 extended through a transverse opening 61 in the remaining or opposite end of the clamping member 57, whereby the clamping members 57 and 59 may be readily adjusted upon and clamped around the foot of the animal. The clamping members 57 and 59 are provided with a padding 62 on their opposed inner faces to prevent injury to the animal. The crank end 47 of the shaft 45 is manipulated to move the rod 50 with the complementary clamping members 57 and 59 longitudinally to bring said complementary clamping members 57 and 59 to position opposite the foot of the animal. The crank end 54 of the rod 52 is manipulated to move the lower end of the rod 50 inwardly or outwardly by rocking the rod 50 and the block 48 on the threaded shaft 45, and thus bring the clamping members 57 and 59 inwardly or outwardly in the frame or body to permit proper engagement of the clamping members 57 and 59 on the foot of the animal, according to the location of the foot of the animal over the false bottom 23 of the rack. These adjustments are essential, owing to the different sizes of animals and the size of the setting of the feet of the individual animal. For instance, some animals have their forward and rear feet close together while others stand with the feet widely separated. In order to further assure firm holding of the animal in the desired position and prevent movement of the feet or legs, a pair of rods 63 having a covering 64 of leather or other appropriate material and with one end 65 of each rod enlarged to form a head, are employed. These rods 63 are extended through selected openings 66 in the lower portions of the side members 14 and 18 of the frame or body at points just above the joints in the legs of the animal, the forward rods being passed transversely through the frame or body, forwardly of the front legs of the animal, while the rear rod 63 is passed in a similar manner transversely through the frame or body, just rearwardly of the hind legs of the animal. These rods are readily insertable and removable.

As the construction of the device has thus been described in detail, brief reference is now had to its use and modus operandi: The animal is led into the frame or body when the end members 24 are open and the body or frame is in upright position with the false bottom or floor 23 in place. After the animal has entered the frame or body of the device with its legs substantially opposite the leg clamping and holding mechanism, the end members 24 and the side member 18 of the frame or body are closed against the animal, the side 18 being adjusted toward the animal until the padded inner faces or sides of both of the side members 14 and 18, firmly engage the sides of the animal. As the end members 24 are closed, the rods 28 projecting therefrom are passed through the openings 27 with which they register in the arms 26 of the end members 24 and the latch members 29 are closed over the arms 26. The neck of the animal may be strapped against the extension 9 of the frame side member 14 to prevent undue movement of the neck and head of the animal. If a halter or other head gear is worn by the animal, such as employed for a horse, this head gear may be secured in an appropriate manner to the side frame member extension 20. After the animal has been thus secured in the frame or body of the device, the rods 45 and 53 are manipulated to bring the pairs of clamping members 57 and 59 to proper position for clamping engagement around the feet of the animal or around the legs thereof close to the feet and these pairs of clamping members 57 and 59 are then closed upon one another to firmly hold the feet of the animal against movement. The rods 63 are then passed in front of the forward legs of the animal and behind the rear legs thereof, just above the joints to prevent movement of the legs at these joints. The animal being thus firmly held against movement within the rack, the crank end 42 of the shaft 41 is then manipulated to operate the sprocket chains 32 and tilt the rack with the animal held firmly therein over on the side, above the base 11, in which position the rack rests firmly on the upstanding portions 12 to which it is hinged and the supports 44 carried by the base 11, the sprocket chains 32 and the frame 37 supporting the same changing during this operation from an inclined plane to a substantially vertical plane. With the frame or body of the rack and the animal thus supported on the side, the members 22 may be readily swung on their fulcrum points and the false bottom or floor 23 of the device removed to permit free access to the feet of the animal for the purpose of shoeing the same or cleaning the hoof. It is apparent that these operations and many other operations may be performed on the animal while the same is securely held in this position, without the operator finding it necessary to support even a portion of the weight of the animal or being in danger of being injured by the animal. The false bottom or floor 23 may be replaced and the members 22 brought back to normal position beneath the same before returning the body or frame of the rack with the animal therein to its normal upright position. This operation of returning the body or frame of the rack with the animal therein from its horizontal tilted position to its normal upright position may be just as easily accomplished by operating the shaft 41 in the reverse direction by means of the extended crank ends 42 of said shaft 41. When it is desired to release the animal, the pairs of co-operating clamping members 57 and 59 may be readily opened or separated to release the feet of the animal and then moved away from the feet of the animal by proper manipulation of the crank end 54 of the rod 53 and the crank ends 47 of the shaft 45.

With the feet thus released and the rod 63 also withdrawn from against the forward and rear legs of the animal, the latch members 29 would then be disengaged and the end members 24 of the frame or body swung open on their hinges 25 and the adjustable side member 18 of the frame or body drawn outwardly away from the animal and the neck and head of the animal released from the end extension 20 of the other side 14, thus completely freeing the animal so that it may walk out of the device in a natural manner.

I claim:

1. A horse shoeing and veterinary rack including a stationary base; a rectangular body having one side hinged on said base; a second side adjustable toward and away from the first mentioned side of said body; supporting and guiding means for said second mentioned side carried by the first mentioned side of the body; end members for said body carried by the first mentioned side and adapted to be locked on the second mentioned side of the body after adjustment of the latter; said sides and ends of the body being padded on their inner faces contacting with an animal clamped in said rack to prevent injury to said animal; a false bottom for said body; supporting and suspending means for said false bottom carried by a side of the body; means adjustable on either side of said body for holding firmly the legs of the animal clamped in said body and preventing movement of said legs in any direction; and means operable on said base and connected with the upper edge of the first mentioned side of the body for tilting the body with the animal therein on to said base and returning said body to upright position with the animal therein.

2. A horse shoeing and veterinary rack including a base; a body including a side member hinged to an upstanding portion of said base at one side of the latter; a second side for said body adjustable toward and away from the first mentioned side thereof; end members hinged to the first mentioned side of said body and adapted to close against the ends of the second mentioned side; means for securing said end members of the body against the second mentioned side after adjustment of the latter with respect to the first mentioned side of the body; supporting and guiding means for said second mentioned side carried by the first mentioned side; pairs of clamping members for the legs and feet of an animal clamped in said body; adjustable suspending means for said pairs of clamping members; said pairs of last mentioned means being carried on the sides of said body and adapted to be adjusted thereon longitudinally and transversely of the body to bring the pairs of clamping members into position for clamping on the legs and feet of the animal; and means operable on said base for tilting said body and the animal clamped therein on to one side over said base and returning said body and animal to upright position without placing any portion of the weight of the body and the animal on the operator.

3. A horse shoeing and veterinary rack including a stationary base having upstanding portions; a body hingedly connected to the upstanding portions of the base at one side thereof; said body being adjustable to the size of an animal to be clamped therein; said body having means on its inner face contacting with the animal to prevent injury to the latter; said body having an extension at one end for the neck and head of the animal; one side of the body being adjustable toward and away from the other side thereof; the ends of said body being adapted to be opened and closed on to the adjustable side of the frame; means carried by said body and adjustable transversely and longitudinally thereof for supporting pairs of clamping members; said pairs of clamping members being padded and adapted to be adjustably clamped on the legs of the animal at the feet thereof to prevent movement of the feet; means adapted for adjustment through the sides of the body and across the legs of the animal above the joints thereof to prevent movement of the legs; a removable and replaceable false bottom for said body; means for tilting said body and the animal clamped therein on to said base and returning the body and animal to upright position; and means carried by said base to receive and support the body and the weight of the animal therein when said body is tilted on to said base.

4. A horse shoeing and veterinary rack including a rectangular stationary base formed of angle iron and having upstanding portions at one side; a body hinged and mounted to said upstanding portions of the base; said body being adapted to be adjustably clamped on an animal positioned therein; a removable and replaceable false bottom for said body; means supported on said body and adjustable longitudinally and transversely thereof for holding the respective feet of the animal against movement; clamping means removably extended through said body to prevent bending of the legs of the animal at the joints thereof; a sprocket chain connected with the upper edge of said body for tilting the same on to said base and returning said body and animal to upright position; supporting means and operating means for said sprocket chain mounted on said base; and means on said base for supporting said body in tilted position thereover.

5. A horse shoeing and veterinary rack including a stationary base; a body hinged on said base and adapted to be adjusted to and clamped on an animal to be operated upon; adjustable foot engaging clamps carried by said body for holding each leg of the animal; and individual means for moving each of said clamps longitudinally and transversely.

6. A horse shoeing and veterinary rack including a stationary base; an adjustable body for clamping therein an animal to be operated upon; said body being mounted on said base and adapted to be tilted thereon with the animal firmly held in said body; adjustable clamps carried by said body for holding each leg of the animal; means for moving said clamps transversely; other means for moving said clamps longitudinally for adjustment on the legs of the animal; and means mounted upon and operable on said base to tilt the body over on to said base and return the body to normal upright position without leaving any of the weight of the body and the animal therein on the operator.

JOHN DUNCAN CAMERON.